Jan. 8, 1929. 1,698,540
E. M. FILBER
QUACK GRASS MACHINE
Filed Dec. 22, 1927 2 Sheets-Sheet 1
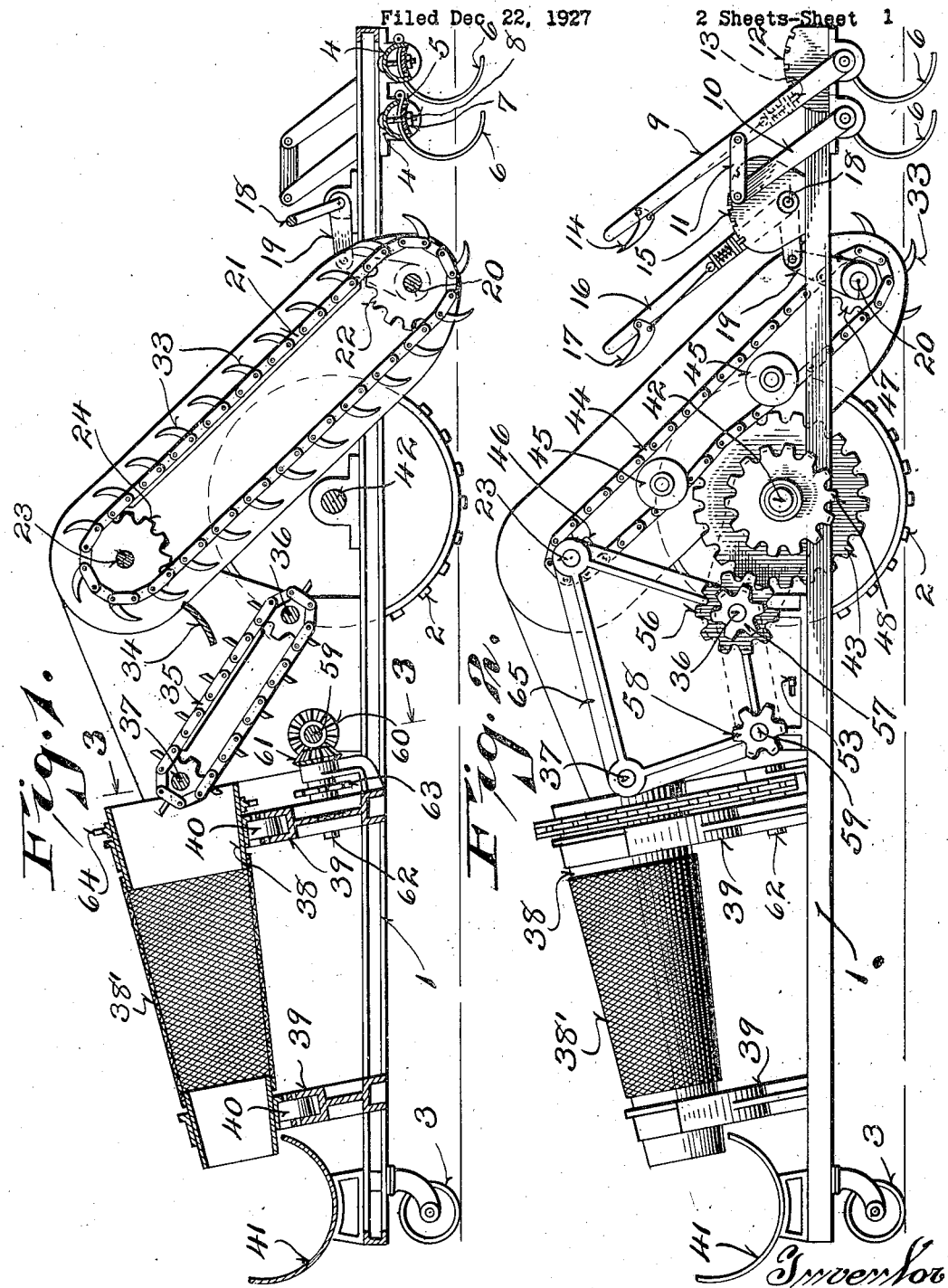
Inventor
E. M. Filber

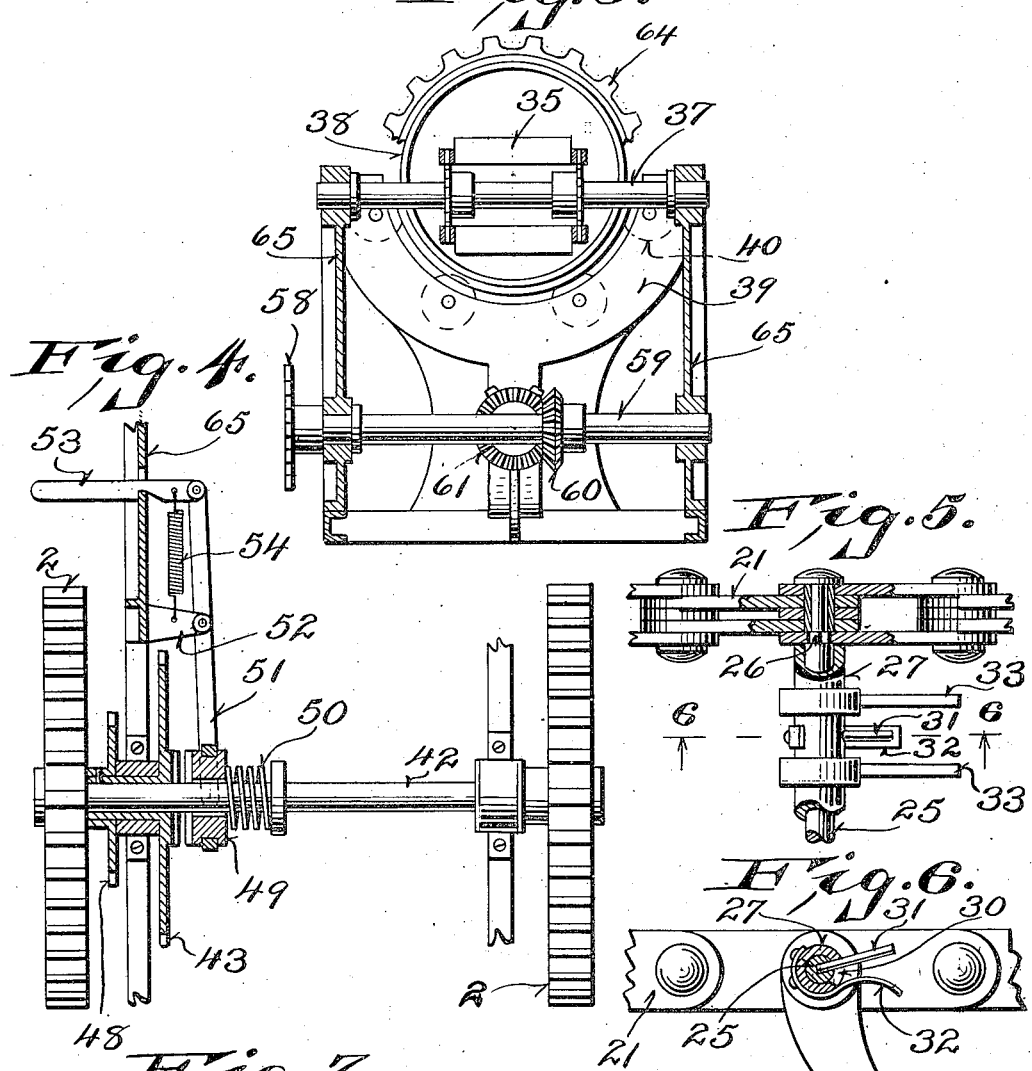

Patented Jan. 8, 1929.

1,698,540

UNITED STATES PATENT OFFICE.

EDWARD M. FILBER, OF WAUSAU, WISCONSIN.

QUACK-GRASS MACHINE.

Application filed December 22, 1927. Serial No. 241,825.

This invention relates to quack grass machines.

Objects of this invention are to provide a quack grass machine which will dig up the ground and the quack grass, which will elevate the quack grass, which will free it from dirt and allow the dirt to fall from the machine, and which will retain the quack grass and discharge it into a hopper, so that it may be completely and bodily removed from the field.

Further objects are to provide a quack grass machine in which the depth of cut is adjustable, in which the digging and elevating conveyor is also adjustable to correspond to the depth of cut, in which the teeth are movably carried by the elevator or conveyor and will bounce or vibrate at the upper portion of the travel of the elevator to facilitate discharge of the grass and any adhering dirt, and in which a revolving drum is provided through which the grass will pass to thus completely free it from any dirt before it is discharged into a retaining hopper.

Further objects are to provide a quack grass machine in which the operation of the conveyor and drum are controlled so that they may be thrown into or out of operation, and in which the harrow teeth and the conveyor digging teeth are adjustable as to depth of cut, so that they may be raised clear of the ground when the machine is travelling to or from the work.

An embodiment of the invention is shown in the accompanying drawings in which:

Figure 1 is a longitudinal sectional view through the machine;

Figure 2 is a side elevation of the machine with one of the wheels removed for the sake of clearness;

Figure 3 is a transverse sectional view on the line 3—3 of Figure 1;

Figure 4 is a fragmentary sectional view showing the control clutch;

Figure 5 is a detailed view of a portion of the digging conveyor or main conveyor with parts in section;

Figure 6 is a sectional view on the line 6—6 of Figure 5;

Figure 7 is a detail partly in section of one of the bars for the harrow teeth.

Referring to the drawings, it will be seen that the machine comprises a pair of side frame bars 1 which are supported by means of a pair of bull wheels 2 or main wheels. It is supported adjacent its rear by means of a caster wheel 3.

Adjacent the front of the machine, a pair of tubular rocking bars or harrow bars 4 are provided, as may be seen from Figures 1 and 7. These harrow bars are pivoted at their ends, and intermediate their ends are of tubular construction with a portion of their bottom cut away and with notches formed in their downwardly projecting edges, as indicated by the reference character 5 in Figure 1. A plurality of curved teeth 6 are seated within the notches and are held in place by means of the binding bars 7, one bar being provided for each tooth, as shown in Figure 7. These binding bars are drawn up tight against the teeth by means of the bolts 8. Obviously, if one of the teeth 6 breaks it may be readily replaced without disturbing any of the remaining teeth.

These bars which carry the harrow teeth or digging teeth are provided with adjusting means. For instance, the front bar may be provided with the hand lever 9 and the rear bar with an auxiliary lever 10, such levers being joined by means of the link 11, as shown in Figure 2. The lever 9 is mounted adjacent a notched segmental plate 12 into which the latching plunger 13 is adapted to pass, such plunger being controlled by the hand grip 14. Thus, the digging teeth at the forward end of the machine may be elevated clear of the ground or may be adjusted to vary the depth of cut, as required. If desired, these teeth may be made resilient to have a certain amount of yield in the event that they strike unyielding obstructions.

Immediately rearwardly of the notched segmental member 12 is positioned a second member 15 which cooperates with a hand lever 16 similarly equipped with a hand grip 17 and with a latching pawl, as previously described. This hand lever is rigidly connected to a transverse shaft 18 provided with a pair of levers 19 adjacent its ends which support the shaft 20 of the main conveyor or digging conveyor 21, as is obvious from Figures 1 and 2. The shaft 20 carries sprocket wheels 22 which support the lower end of the conveyor, and an upper shaft 23 is provided with sprocket wheels 24 which support the upper end of the conveyor. The conveyor is formed of a plurality of links, as shown in Figure 5.

and is also equipped with transversely extending pins 25. These pins have squared portions 26 which fit in correspondingly shaped apertures in one of the links, as shown in such figure, and which thus hold the pins against turning. These pins carry sleeves 27 which are loosely mounted thereon and which are provided with notches or cutouts 30. Radial pins 31 (see Figure 6) are carried by the pins 25 and project through these notches. The sleeves 27 are provided with springs 32 adapted to engage the radial pins when the teeth 33, which are rigidly carried by the sleeves 27, drop over at their upper position, as shown in Figure 1. Under these conditions, the springs 32 strike the radial pins or stops 31 and cause the teeth to bounce or bound, and thus discharge the quack grass with greater facility than if rigid teeth were employed.

The quack grass from the elevating and digging conveyor or main conveyor is guided by means of the transverse member 34 (see Figure 1) onto an auxiliary conveyor 35. The auxiliary conveyor is carried by sprocket wheels mounted upon shafts 36 and 37 and discharges into a revolubly mounted drum 38. The drum is rotated as hereinafter described and is preferably conical having its largest end presented towards the auxiliary conveyor 35. The drum is perforated or else is provided with a mesh or screened portion, as indicated by the reference character 38' in Figure 1.

This drum is carried in bearing 39 which may be, if desired, provided with rollers or small wheels 40, as shown in Figure 3, and which bear upon the drum and support it and thus reduce friction. Rearwardly of the drum, the receiving hopper 41 is positioned and is adapted to receive the quack grass after it has been freed from the adhering dirt.

The drive for the machine is from the main wheels 2. One or both of these wheels is rigidly mounted upon a shaft 42. The shaft loosely carries a relatively large sprocket wheel 43 adapted to engage a chain 44 (see Figure 2). This chain 44 is guided on opposite sides of the sprocket wheel 43 by means of the rollers 45. The chain passes over an upper sprocket wheel 46 loosely mounted on the shaft 23 and passes over a lower sprocket wheel 47 rigidly mounted upon the shaft 20 and thus acts to drive the shaft 20.

Further it is to be noted that the sprocket wheel 43 is rigidly connected to a smaller sprocket wheel 48 (see Figure 4), and that these sprocket wheels may be thrown into or out of operative connection with the shaft 42 by means of the clutch member 49. The clutch member 49 is loosely splined to the shaft 42 and provided with teeth adapted to engage cooperating teeth carried by the sprocket wheel 43. It is urged into clutch closing position by means of the spring 50, as shown in Figure 4, and is held outwardly by means of the lever 51, under certain conditions. This lever 51 is pivoted upon a bracket 52 intermediate its ends and its upper end carries a latching handle or latching member 53. This latching member is urged downwardly by means of the spring 54. The latch 53 passes through a slot in the frame 65 of the machine, as shown in Figure 4, and is provided with a notch for locking the device in clutch open position.

Referring to Figure 2, it will be seen that the sprocket wheel 48 is connected by means of a chain with a sprocket wheel 56 rigidly mounted upon the shaft 36, which shaft, it will be noted, carries one of the sprocket wheels for the auxiliary conveyor 35, and thus driving of the auxiliary conveyor is effected. The shaft 36 also carries a sprocket wheel 57 which is connected by means of a chain to a sprocket wheel 58 rigidly mounted upon a transverse shaft 59. The transverse shaft 59, as shown in Figures 1 and 3, is provided with a bevel gear 60 meshing with a bevel gear 61 on a short stub shaft 62. The shaft 62 carries a sprocket wheel 63 which is connected by means of a chain with an annular sprocket wheel 64 rigidly attached to the drum 38, as is apparent from Figures 1 and 2.

From the mechanism thus far described, it will be seen that the main and auxiliary conveyors, and the separating drum, are driven from the main wheels of the device as the device is drawn across the field by any suitable means.

It is to be noted also that side plates are provided which are mounted on the outside of the main and auxiliary conveyors. Further, it is preferable to provide a rectangular frame 65 which provides bearings for the shafts 23, 36, 59, and 37, as may be seen from Figure 2.

The operation of the machine is as follows:

When it is being transported to the field, the teeth 6 are elevated and also the lower end of the main or digging conveyor. This lifts these parts clear of the ground. Further, the clutch is open so as to prevent needless driving of the conveyors and drum. After the machine has arrived at the field where the work is to be done, the teeth 6 are adjusted to the desired depth and the digging or main conveyor has its lower end also lowered to correspond to this depth. Thereafter, the clutch is closed and the machine is drawn across the field. The teeth 6 break up the ground and aid in the digging of the main conveyor. This main conveyor actually digs the quack grass free of the ground and elevates it and drops it on the auxiliary conveyor. A part of the dirt falls from these conveyors, but the remaining dirt is separated from the quack grass by the revolving drum. The revolving drum allows the dirt to fall through its perforated or screened portion, as is apparent from Figures 1 and 2. The quack grass freed from the dirt is then discharged into the retaining hopper 41.

It will be seen that a novel form of quack grass machine has been provided, in which the digging and elevating means may be raised or lowered, as desired, to both regulate the depth of cut and also to lift the digging instrumentalities free of the ground under certain conditions, as when the machine is travelling to and from the work.

Further, it will be seen that means are provided for freeing the quack grass from any adhering dirt and allowing the dirt to fall from the machine.

It will be seen further that the machine is of eminently practical and of relatively simple and sturdy construction and is easy to operate.

Although the invention has been described in considerable detail, such description is intended as illustrative rather than limiting as the invention may be variously embodied and as the scope of such invention is to be determined as claimed.

I claim:

1. A quack grass machine comprising a main frame, supporting wheels therefor, a shaft rigid with certain of said wheels, a sprocket carried by said shaft, a main digging and elevating conveyor driven from said sprocket and having teeth adapted to dig into the ground, an auxiliary conveyor adapted to receive the grass from said main conveyor, a screen drum having open ends into one of which said auxiliary conveyor projects, means for driving said auxiliary conveyor and said drum from said shaft, a hopper located at the rear of said drum, said teeth being free for limited rocking motion with reference to said main conveyor.

2. An elevating and digging conveyor for a quack grass machine, said conveyor having teeth adapted to dig into the ground, said conveyor having transverse pins and said teeth being carried by sleeves mounted for limited rocking motion upon said pins, springs carried by said sleeves for causing bouncing of said teeth as they arrive at the upper portion of said main conveyor, and means for driving said main conveyor.

In testimony that I claim the foregoing I have hereunto set my hand at Wausau, in the county of Marathon and State of Wisconsin.

EDWARD M. FILBER.